US008621239B2

(12) United States Patent
Lambert

(10) Patent No.: US 8,621,239 B2
(45) Date of Patent: *Dec. 31, 2013

(54) METHOD FOR STRENGTHENING THE IMPLEMENTATION OF ECDSA AGAINST POWER ANALYSIS

(75) Inventor: Robert J. Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,557

(22) Filed: Sep. 14, 2012

(65) Prior Publication Data

US 2013/0073867 A1  Mar. 21, 2013

Related U.S. Application Data

(63) Continuation of application No. 12/495,429, filed on Jun. 30, 2009, now Pat. No. 8,280,048, which is a continuation of application No. 10/119,803, filed on Apr. 11, 2002, now Pat. No. 7,599,491, which is a continuation of application No. 09/900,959, filed on Jul. 10, 2001, now Pat. No. 7,092,523, which is a continuation-in-part of application No. PCT/CA00/00030, filed on Jan. 14, 2000, and a continuation-in-part of application No. PCT/CA00/00021, filed on Jan. 11, 2000.

(30) Foreign Application Priority Data

Jan. 11, 1999 (CA) ..................................... 2258338
Jan. 15, 1999 (CA) ..................................... 2259089

(51) Int. Cl.
*G06F 11/30* (2006.01)
*H04L 9/30* (2006.01)
*G06F 12/14* (2006.01)
*H04L 9/00* (2006.01)

(52) U.S. Cl.
USPC ................. 713/189; 380/30; 380/44; 380/46; 380/277

(58) Field of Classification Search
None
See application file for complete search history.

(56) References Cited

U.S. PATENT DOCUMENTS 4,519,036 A  5/1985  Green
5,202,995 A  4/1993  O'Brien
(Continued)

FOREIGN PATENT DOCUMENTS

CA  2129203 A1  1/1996
CA  2316227 A1  7/1999
(Continued)

OTHER PUBLICATIONS

Kocher, Paul C.; "Timing Attacks on Implementations of Diffie-Hellman, RSA, DSS and Other Systems"; Advances in Cryptology—CRYPTO '96, 16$^{th}$ Annual International Cryptology Conference, Santa Barbara, California, Aug. 18-22, 1996; pp. 104 to 113; Lecture Notes in Computer Science; vol. 1109; Springer.

(Continued)

*Primary Examiner* — Nathan J. Flynn
*Assistant Examiner* — Trang Doan
(74) *Attorney, Agent, or Firm* — Dimock Stratton LLP; Etienne de Villiers

(57) ABSTRACT

A method of inhibiting the disclosure of confidential information through power analysis attacks on processors in cryptographic systems. The method masks a cryptographic operation using a generator G. A secret value, which may be combined with the generator G to form a secret generator is generated. The secret value is divided into a plurality of parts. A random value is generated for association with the plurality of parts. Each of the plurality of parts is combined with the random value to derive a plurality of new values such that the new values when combined are equivalent to the secret value. Each of the new values is used in the cryptographic operation, thereby using the secret generator in place of the generator G in the cryptographic operation. The introduction of randomness facilitates the introduction of noise into algorithms used by cryptographic systems so as to mask the secret value and provide protection against power analysis attacks.

20 Claims, 3 Drawing Sheets

(56) References Cited

U.S. PATENT DOCUMENTS

| | | | |
|---|---|---|---|
| 5,511,198 A | | 4/1996 | Hotta |
| 5,524,222 A | | 6/1996 | Hervin |
| 5,627,893 A | | 5/1997 | Demytko |
| 5,650,948 A | * | 7/1997 | Gafter .......................... 716/103 |
| 5,675,645 A | * | 10/1997 | Schwartz et al. .............. 713/187 |
| 5,757,918 A | * | 5/1998 | Hopkins ......................... 705/67 |
| 5,764,772 A | * | 6/1998 | Kaufman et al. ............... 380/30 |
| 5,768,389 A | | 6/1998 | Ishii |
| 5,778,069 A | | 7/1998 | Thomlinson et al. |
| 5,825,880 A | | 10/1998 | Sudia et al. |
| 5,892,899 A | | 4/1999 | Aucsmith et al. |
| 5,937,066 A | | 8/1999 | Gennaro et al. |
| 6,279,110 B1 | | 8/2001 | Johnson et al. |
| 6,298,135 B1 | | 10/2001 | Messerges et al. |
| 6,304,658 B1 | | 10/2001 | Kocher et al. |
| 6,307,940 B1 | * | 10/2001 | Yamamoto et al. ........... 380/277 |
| 6,327,661 B1 | * | 12/2001 | Kocher et al. ................. 713/193 |
| 6,334,189 B1 | * | 12/2001 | Granger et al. ................ 726/26 |
| 6,411,715 B1 | * | 6/2002 | Liskov et al. ................. 380/277 |
| 6,419,159 B1 | * | 7/2002 | Odinak .......................... 235/492 |
| 6,446,207 B1 | * | 9/2002 | Vanstone et al. .............. 713/180 |
| 6,496,929 B2 | * | 12/2002 | Lenstra ......................... 713/161 |
| 6,724,894 B1 | * | 4/2004 | Singer ............................ 380/28 |
| 6,873,706 B1 | * | 3/2005 | Miyazaki et al. ............... 380/30 |
| 6,914,986 B2 | * | 7/2005 | Handschuh .................... 380/30 |
| 7,386,130 B2 | * | 6/2008 | Ito et al. ......................... 380/263 |
| 7,421,074 B2 | * | 9/2008 | Jin et al. ......................... 380/30 |
| 2001/0048742 A1 | * | 12/2001 | Handschuh .................... 380/30 |
| 2001/0053220 A1 | * | 12/2001 | Kocher et al. .................. 380/29 |
| 2002/0166058 A1 | * | 11/2002 | Fueki ............................. 713/194 |
| 2003/0044003 A1 | * | 3/2003 | Chari et al. ..................... 380/28 |
| 2003/0048903 A1 | * | 3/2003 | Ito et al. ......................... 380/263 |
| 2003/0061498 A1 | | 3/2003 | Drexler et al. |

FOREIGN PATENT DOCUMENTS

| | | | |
|---|---|---|---|
| EP | 0383985 | A1 | 8/1990 |
| FR | 2672402 | A1 | 8/1992 |
| WO | WO 98/00771 | A1 | 1/1998 |
| WO | WO 98/52319 | A1 | 11/1998 |
| WO | WO 99/35782 | A1 | 7/1999 |
| WO | WO 00/42733 | A1 | 7/2000 |

OTHER PUBLICATIONS

Johnson, Don; Menezes, Alfred; Vanstone, Scott A.; "The Elliptic Curve Digital Signature Algorithm (ECDSA)"; Certicom Corporation White Paper 2001; pp. 25-26.

Kelsey, John; Schneier, Bruce; Wagner, David; Hall, Chris; "Side Channel Cryptanalysis of Produce Ciphers"; Journal of Computer Security; 2000; pp. 141 to 158; vol. 8, No. 2-3; IOS Press; Amsterdam, The Netherlands.

Kocher, Paul; Jaffe, Joshua, Jun, Benjamin; "Differential Power Analysis"; Advances in Cryptology—Crypto '99, Proceedings of the $19^{th}$ International Annual Cryptology Conference; Aug. 1999; Springer-Verlag; Berlin, Germany.

Wharton, John; An introduction to the Intel® MCS-51™ Single-Chip Microcomputer Family; Intel Application Note AP-69; May 1980; U.S.A.

Kocher, Paul; Jaffe, Joshua, Jun, Benjamin; "Introduction to Differential Power Attack Analysis and Related Attacks"; 1998; http://www.cryptography.com/dpa/technical.

Deitel, Harvey M.; Deitel, P.J.; C++ How to Program++; 1994; pp. 58-62; Prentice-Hall.

Huhnlein, Detlef; "Vergleichende Implementierung eines auf Elliptischen Kurven basierenden Signaaturverfahrens in affiner und projektiver Arithmetik"; Dissertation, eingereicht bei der Fachhochschule Würzburg-Schweinfurt-Aschaffenburg; Nov. 14, 1995; Abridged version.

Schnorr, C.P.; Efficient Signature Generation by Smart Cards; Journal of Cryptology, 4; 1991; pp. 161-174; Springer-Verlag, New York.

Anderson, John, C. In "Reponses to NIST's Proposal"; Communications of the ACM; Jul. 1992; pp. 41 to 54; vol. 35, No. 7.

Menezes A. et al.; "Elliptic Curve Cryptosystems and Their Implementation"; Journal of Cryptography; 1993; pp. 209 to 224; vol. 6, No. 4.

Menezes, Alfred J. et al.; Handbook of Applied Cryptography; 1996; pp. 63 to 77, 451 to 454 and 515 to 520; CRC Press LLC.

Shreih, Raghid; Examiner's Report issued in respect of Canadian Patent Application No. 2,259,089; Feb. 2, 2009; received by applicant's agent Feb. 9, 2009.

* cited by examiner

METHOD FOR STRENGTHENING THE IMPLEMENTATION OF ECDSA AGAINST POWER ANALYSIS

CROSS REFERENCE TO RELATED APPLICATIONS

This application is a continuation of U.S. application Ser. No. 10/119, 803 filed on Apr. 11, 2002 which is a continuation-in-part of U.S. application Ser. No. 09/900,959 filed on Jul. 10, 2001, now U.S. Pat. No. 7,092,523; which is a continuation-in-part of application No. PCT/CA00/00021 filed on Jan. 11, 2000 claiming priority from Canadian Application No. 2,258,338 filed Jan. 11, 1999, and a continuation-in-part of application No. PCT/CA00/00030 filed on Jan. 14, 2000 claiming priority from Canadian Application No. 2,259,089 filed on Jan. 15, 1999. The contents of all the above applications are incorporated herein by reference.

FIELD OF THE INVENTION

This invention relates to a method for minimizing the vulnerability of cryptographic systems to power analysis-type attacks.

BACKGROUND OF THE INVENTION

Cryptographic systems generally owe their security to the fact that a particular piece of information is kept secret. When a cryptographic algorithm is designed, it is usually assumed that a potential attacker has access to only the public values. Without the secret information it is computationally infeasible to break the scheme or the algorithm. Once an attacker is in possession of a piece of secret information they may be able to forge the signature of the victim and also decrypt secret messages intended for the victim. Thus it is of paramount importance to maintain the secrecy and integrity of the secret information in the system. The secret information is generally stored within a secure boundary in the memory space of the cryptographic processor, making it difficult for an attacker to gain direct access to the secret information. Manufacturers incorporate various types of tamper-proof hardware to prevent illicit access to the secret information. In order to decide how much tamper proofing to implement in the cryptographic system, the designers must consider the resources available to a potential attacker and the value of the information being protected. The magnitude of these resources is used to determine how much physical security to place within the device to thwart attackers who attempt to gain direct access to the secure memory. Tamper-proof devices can help prevent an attacker who is unwilling or unable to spend large amounts of time and money from gaining direct access to the secret information in the cryptographic system. Typically, the amount of work that is required to defeat tamper proof hardware exceeds the value of the information being protected.

However, a new class of attacks has been developed on cryptographic systems that are relatively easy and inexpensive to mount in practice since they ignore the tamper-proof hardware. Recent attacks on cryptographic systems have shown that devices with secure memory may leak information that depends on the secret information, for example in the power usage of a processor computing with private information. Such attacks take advantage of information provided by an insecure channel in the device by using the channel in a method not anticipated by its designers, and so render redundant any tamper proofing in the device. Such insecure channels can be the power supply, electromagnetic radiation, or the time taken to perform operations. At particular risk are portable cryptographic tokens, including smart cards, pagers, personal digital assistants, and the like. Smart cards are especially vulnerable since they rely on an external power supply, whose output may be monitored non-intrusively. Access to the power supply is required for proper functioning of the device and so is not usually prevented with tamper-proof hardware.

Further, constrained devices tend not to have large amounts of electromagnetic shielding. Since the device is self-contained and dedicated, the power consumption and electromagnetic radiation of the smart card may be monitored as the various cryptographic algorithms are executed. Thus in a constrained environment, such as a smart card, it may be possible for an attacker to monitor an unsecured channel that leaks secret information. Such monitoring may yield additional information that is intended to be secret which, when exposed, can significantly weaken the security of a cryptographic system.

In response to the existence of such unsecured channels, manufacturers have attempted to minimize the leakage of information from cryptographic devices. However, certain channels leak information due to their physical characteristics and so it is difficult to completely eliminate leakage. A determined attacker may be able to glean information by collecting a very large number of samples and applying sophisticated statistical techniques. In addition, there are severe restrictions on what can be done in hardware on portable cryptographic tokens that are constrained in terms of power consumption and size. As a result, cryptographic tokens are particularly vulnerable to these types of attacks using unsecured channels.

The more recent attacks using the power supply that can be performed on these particularly vulnerable devices are simple power analysis, differential power analysis, higher order differential power analysis, and other related techniques. These technically sophisticated and extremely powerful analysis tools may be used by an attacker to extract secret keys from cryptographic devices. It has been shown that these attacks can be mounted quickly and inexpensively, and may be implemented using readily available hardware.

The amount of time required for these attacks depends on the type of attack and varies somewhat by device. For example it has been shown that simple power analysis (SPA) typically takes a few seconds per card, while differential power analysis (DPA) can take several hours. In order to perform SPA, the attacker usually only needs to monitor one cryptographic operation. To perform DPA, many operations must be observed. In one method used, in order to monitor the operations, a small resistor is connected in series to smart card's power supply and the voltage across the resistor is measured. The current used can be found by a simple computation based on the voltage and the resistance. A plot of current against time is called a power trace and shows the amount of current drawn by the processor during a cryptographic operation. Since cryptographic algorithms tend to perform different operations having different power requirements depending on the value of the secret key, there is a correlation between the value of the secret key and the power consumption of the device.

Laborious but careful analysis of end-to-end power traces can determine the fundamental operation performed by the algorithm based on each bit of a secret key and thus, be analyzed to find the entire secret key, compromising the system. DPA primarily uses statistical analysis and error correction techniques to extract information that may be correlated to secret keys, while the SPA attacks use primarily visual inspection to identify relevant power fluctuations. In SPA, a power trace is analyzed for any discernible features corresponding to bits of the secret key. The amount of power consumed varies depending on the executed microprocessor instructions. For example, in a typical "square-and-multiply" algorithm for exponentiation, a bit 1 in the exponent will cause the program to perform both squaring and multiply operations, while a bit 0 will cause the multiply operation to be skipped. An attacker may be able to read off the bits of a secret exponent by detecting whether the multiply operation is performed at different bit positions.

A DPA attack attempts to detect more subtle features from the power traces and is more difficult to prevent. To launch a DPA attack, a number of digital signatures are generated and the corresponding power traces are collected. The power trace may be regarded as composed of two distinct parts, namely signal and noise. The patterns that correspond to private key operations tend to remain more or less constant throughout all power traces. These patterns may be regarded as the signal. The other parts of the computation, which correspond to changing data, result in differing patterns in each power trace. These patterns can be regarded as the noise. Statistical analysis can be performed on all the power traces to separate the signal from the noise. The secret value is then derived using the identified signal.

Various techniques for preventing these power analysis attacks have been attempted to date. Manufacturers of smart cards and smart card processors have introduced random wait states and address scrambling. Smart card algorithms avoid performing significantly different operations depending on the value of a secret key and also avoid conditional jump instructions. Hardware solutions include providing well-filtered power supplies and physical shielding of processor elements or the addition of noise unrelated to secrets. However, the vulnerabilities to DPA result from transistor and circuit electrical behaviors that propagate to exposed logic gates, microprocessor operation, and ultimately the software implementations. Cryptographic algorithms to date have been designed with the assumption that there is no leakage of secret information, however with the advent of successful power analysis attacks, it is no longer prudent to assume that a cryptographic device which will leak no secret information can be manufactured. Information stored in constrained environments is particularly difficult to protect against leakage through an unsecured channel during cryptographic operations.

Accordingly, there is a need for a system for reducing the risk of a successful power analysis attack and which is particularly applicable to current hardware environments.

SUMMARY OF THE INVENTION

In accordance with this invention, there is provided a method of inhibiting the disclosure of confidential information through power analysis attacks on processors in cryptographic systems. The method of masking a cryptographic operation using a generator G comprises the steps of:

a) generating a secret value, which may be combined with the generator G to form a secret generator;

b) dividing the secret value into a plurality of parts;

c) generating a random value for association with the plurality of parts;

d) combining each of the plurality of parts with the random value to derive a plurality of new values such that the new values when combined are equivalent to the secret value; and e) using each of the new values in the cryptographic operation, thereby using the secret generator in place of the generator G in the cryptographic operation.

The introduction of randomness facilitates the introduction of noise into algorithms used by cryptographic systems so as to mask the secret value and provide protection against power analysis attacks.

BRIEF DESCRIPTION OF THE DRAWINGS

An embodiment of the invention will now be described by way of example only with reference to the accompanying drawings in which.

DESCRIPTION OF THE PREFERRED EMBODIMENTS

A mechanism for protection against power analysis attacks on cryptographic systems involves the introduction of random values into existing algorithms employed by cryptographic systems. These random values are intended to introduce noise into the system.

This technique can be applied to a number of cryptographic systems, including encryption algorithms, decryption algorithms, signature schemes, and the like. In the preferred embodiment, the technique is applied to the ECDSA (elliptic curve digital signature algorithm) on a constrained device, typically a smart card, in order to inhibit the leakage of secret information.

In the ECDSA, as described in the ANSI X9.62 standard, the public values are:

The domain parameters: An elliptic curve group E generated by a point G, and a finite field F.

The signer's long-term public key D (corresponding to a long-term private key d).

The signature (r, s).

Figure 1:
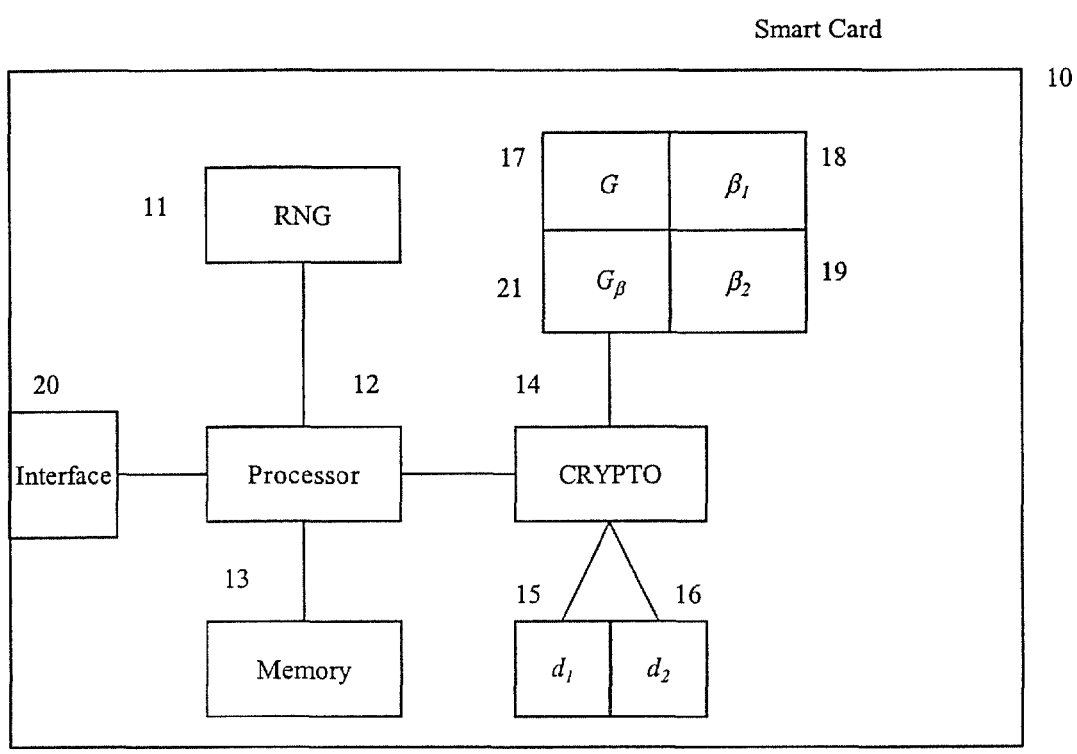
FIG. 1 is a schematic diagram of a constrained device.

FIG. 1 shows generally a smart card (10) for use in a cryptographic system. The smart card incorporates a random number generator (RNG) (11), which may be implemented as hardware or software. The card also includes a cryptographic module (CRYPTO) (14), which may be for example a cryptographic co-processor or specialized software routines. The card includes a memory space (13) for storage needed while making computations, and a parameter storage space (17,18, 19,21) for storing the parameters G, G', $\beta_1$ $\beta_2$ of the system. The card also includes a secure memory space (15,16) for storing its private key d split into two parts $d_1$ and $d_2$, and a processor (12) which may be, for example, an arithmetic logic unit, an integrated circuit, or a general purpose processing unit.

In order to generate a digital signature using an elliptic curve, the signer first computes an elliptic curve point K=kG, where k is a random number and G is the generating point of the elliptic curve group. The value k is selected as a per-message secret key and the point K serves as the corresponding per-message public key. The values k and K are also referred to as an ephemeral private key and an ephemeral public key respectively. These values are used to generate a signature (r, s) wherein:

$K=kG;$ $r = K_x \mod n$, where $K_x$ is the x coordinate of K and n is the order of the generating point G; and $s = k^{-1}(e+dr) \mod n$, where e is the message to be signed.

The ANSI X9.62 standard provides techniques for interpreting the bit strings corresponding to finite field elements as integers in the above calculations. The standard also provides some guidelines on what elliptic curve groups and finite fields can be used.

Several algorithms, using both direct and indirect methods, may be used to compute kG in order to obtain the elliptic curve point K. Algorithms to compute signature components are potentially vulnerable to power analysis attacks since they perform different operations depending on the bits in the secret values. Repeated iterations of the algorithm use the same secret values, and so their power traces are statistically correlated to the secret values.

Figure 2:
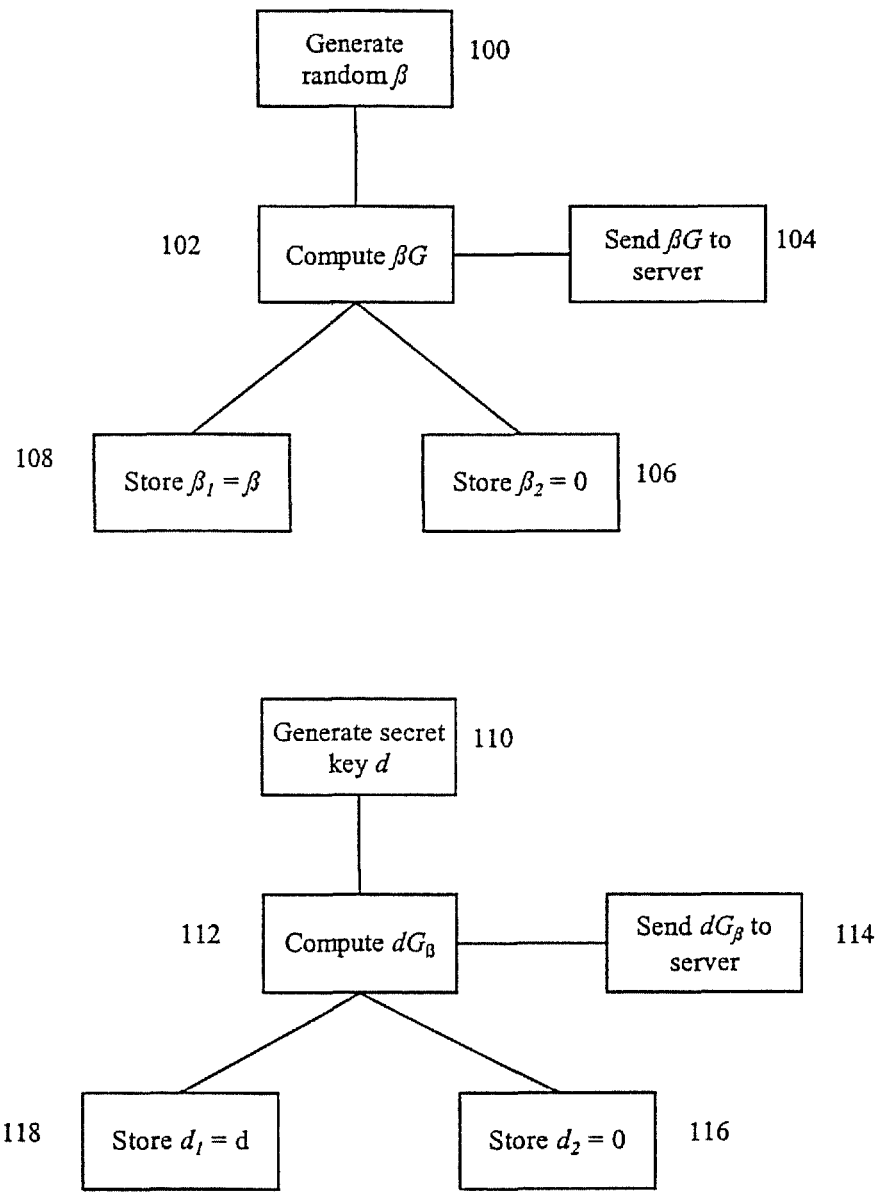
FIG. 2 is a schematic representation of steps of a method performed by the device of FIGS. 1.

In order to mask a private key or other secret value to improve resistance to DPA-like attacks, a random value is introduced into the algorithm as shown in FIG. 2. This random value avoids repeated use of a secret value in order to eliminate correlation among the power traces. There will be no signal to differentiate from the background noise since no operation is repeated on subsequent iterations of the algorithm.

In the case of a long-term private key, the private key d is split into two parts $d_1$ and $d_2$ such that $d = d_1 + d_2$. As seen in FIG. 2, the card generates its private key d (110), then computes the public key dG (112). The public key is sent to the server (114), which keeps it in a directory for future use. A smart card is initialized with a private key d being split into the values $d_1 = d$ (118) and $d_2 = 0$ (116) as is illustrated in FIG. 2. The initialization is performed either by embedding the private key at manufacture or by instructing the smart card to generate its own private key. These initial values $d_1$ and $d_2$ are stored in the device instead of storing the value for d. Each time a digital signature is generated, a random value A is generated using the hardware random number generator 11 and $d_1$ and $d_2$ are updated as follows:

$$d_1 = d_{1\,(old)} + \Delta (\mod n),$$

and $$d_2 = d_{2\,(old)} - \Delta (\mod n).$$

The formula for s, one component of the digital signature, then becomes:

$$s = k^{-1}(e + (d_1 r + d_2 r)) \mod n.$$

When computing the above formula, the quantities $d_1$ and $d_2$ are essentially random values because of the random quantity $\Delta$ that is introduced after each signature. When comparing subsequent signatures, there is no correlation in the side channels to either the calculation of d, r or $d_2 r$ corresponding to the secret key d since the quantities $d_1$ and $d_2$ are randomized in each successive signature but only together does the correlation to d emerge and this changes every time. As a result, leakage of the private key d is minimized when computing the component s of the digital signature. However, the component r of the digital signature is also calculated using the private key k and the calculation of r has still in the past been vulnerable to power analysis type attacks. In order to compute r, the signer must compute kG and so information about the value of the secret key k may leak during the repeated group operations.

In order to protect the per-message secret key k during computation of r, the signer modifies the group generator used. In order to mask the value of k, a random value β is introduced and stored for each smart card such that $G' = \beta G$ where β is a random number generated for each smart card. The point G' can be used as a secret generating point for each user, thus using the random value β to hide some information about k.

It is recognized that the signer's effective per-message secret key is kβ, corresponding to the public key kβ G. The security is thus based on the secrecy of the derived value kβ, which could be computed from k and β, both of which are secret. It is also recognized that the per-message secret key may be regarded as k and the per-message public key as kG'. However, unless the point G' were shared publicly, knowledge of k alone would not permit the computation of shared keys based on kG'.

During smart card personalization, when the private/public key pair is generated on the smart card, the point G' is computed. The introduction of β in the calculation of a digital signature means the formula still contains a constant value, making it vulnerable to power analysis type attacks. In order to overcome these attacks, β is split into two parts $\beta_1$ and $\beta_2$, and those parts are updated by a random value r every time a signature is generated. This process is detailed in FIG. 3.

$$\beta_1 = \beta_{1\,(old)} + \pi.$$

$$\beta_2 = \beta_{2\,(old)} - \pi.$$

In order to verify signatures produced in this manner, the verifier uses standard ECDSA verification from ANSI X9.62 since the signer's secret key remains unchanged when using this technique.

Thus the formulae for the ECDSA signature scheme in the preferred embodiment are:

$$K = kG';$$

$r = K_x \mod n$, where $K_x$ is the x coordinate of K and n is the order of the point G'; and $$s = (k\beta_1 + k\beta_2)^{-1}(e + (d_1 r + d_2 r)) \mod n.$$

Using these formulae to compute ECDSA signatures reduces the vulnerability of the algorithm to power analysis attacks. It is recognized that similar techniques may be applied to other signatures. For example, ECNR or any other signature form could be used. These techniques may also be used individually, not necessarily in combination. Also, the ECDSA signature equation is not a necessary component of these techniques.

Figure 3:
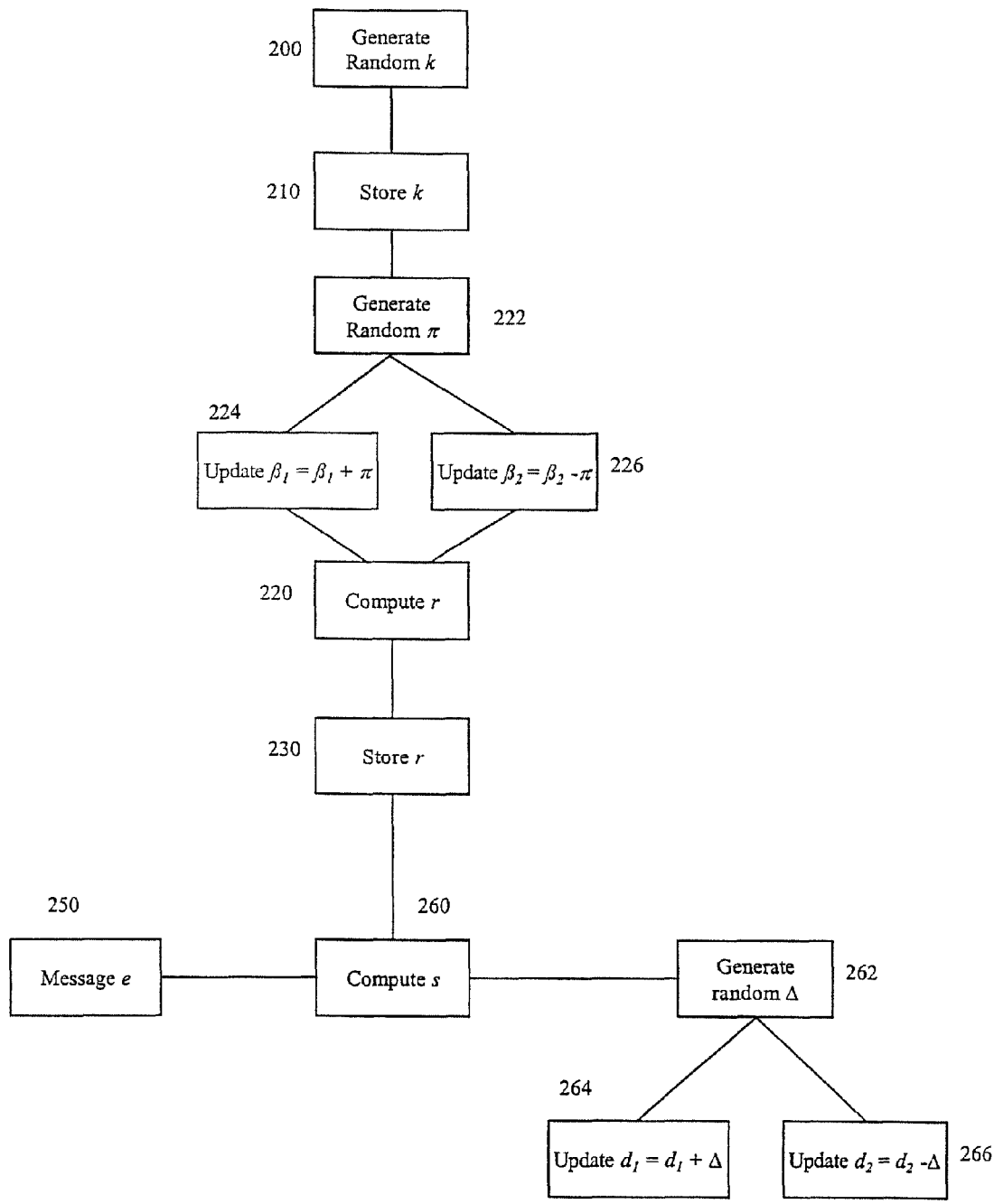
FIG. 3 is a flow diagram illustrating an embodiment of the invention.

FIG. 3 shows the generation of a digital signature in accordance with the above protocol. First, the signer generates a random private session key k (200), and stores k (210) for future use in the algorithm. The signer updates the values $\beta_1$ (224) and $\beta_2$ (226) as described above by generating a random π (222) and then computes the public session key r (220). The signer then obtains the input message e or hash thereof (250). The signer then computes the signature s (260). The signer updates the private key parts $d_1$ (264) and $d_2$ (266) as described earlier by generating a random $\Delta$ (262).

The inverse algorithm used in the generation of the digital signature to compute $k^{-1}$ is also potentially vulnerable to power analysis attacks since it performs repeated operations on the secret key every time a signature is generated. This vulnerability is reduced in a further embodiment by introducing a random w and computing $(kw)^{-1}$ instead of $w^{-1}$. The signing formula works since $k^{-1} = w(kw)^{-1}$.

Thus the formulae for the ECDSA signature scheme in this embodiment are:

$$K = kG';$$

$r = K_x \bmod n$, where $K_x$ is the x coordinate of K and n is the order of the point G'; and $$s = w(kw\beta_1 + kw\beta_2)^{-1}(e + (d_1 r + d_2 r)) \bmod n.$$

Updating the parts of the private key may occur before or after the generation of the random w.

In a further embodiment, since $G' = \beta_1 G + \beta_2 G$, the value of kG' can be computed as $(k\beta_1)G + (k\beta_2)G$. In this way, the value of k is masked when computing kG', even if the value of $\beta$ is determined. The formula for K then becomes: $K = (k\beta_1)G + (k\beta_2)G$.

Although the invention has been described with reference to certain specific embodiments, various modifications thereof will be apparent to those skilled in the art without departing from the spirit and scope of the invention as outlined in the claims appended hereto. For example, it is not necessary that there be two components combining to make the private key.

The invention claimed is:

1. A computing device operative to execute a method of masking a cryptographic operation that combines a signature component r generated using a generator G with a secret value d, said method operating on a plurality of parts split from said secret value d, wherein said plurality of parts may be combined to yield said secret value d, said device comprising:
   a memory;
   a secure memory for storing the plurality of parts; and,
   a processor operative to:
   a) update said plurality of parts with a random value to obtain updated plurality of parts;
   b) apply said signature component r to each of said updated plurality of parts and combine the results to generate a new value;
   c) use said new value in place of a combination of said signature component r and said secret value d in said cryptographic operation.

2. The device of claim 1, wherein the processor is further operative to generate said random value.

3. The device of claim 1, wherein said plurality of parts comprises a first part $d_1$ and a second part $d_2$, and $d_1 + d_2 = d$, wherein said new value comprises $(d_1 r + d_2 r)$, and wherein said processor is further operative to update by adding said random value to said first part $d_1$ and subtracting said random value from said second part $d_2$.

4. The device of claim 1, wherein the cryptographic operation is an elliptic curve digital signature algorithm.

5. The device of claim 1, wherein the processor is further operative to use a modified generator $G' = \beta G$, for a random value $\beta$, wherein $\beta$ is split into a first random part $\beta_1$ and a second random part $\beta_2$, in place of said generator G in said cryptographic operation, and combine said new value with said first random part $\beta_1$ and said second random part $\beta_2$ in said cryptographic operation.

6. The device of claim 1 wherein the device comprises a smart card.

7. A computing device operative to execute a method of computing a digital signature on a message m, said signature being computed by a signer having a private key d and a public key dG, where G is a generator of a cryptographic group, said device comprising:
   a memory;
   a secure memory for storing the plurality of parts; and,
   a processor operative to:
   a) split said private key d into a plurality of private key parts;
   b) combine said plurality of private key parts with a random value $\Delta$ generated for that computed digital signature to obtain updated private key parts;
   c) generate an ephemeral private key k;
   d) obtain a first signature component r from an ephemeral public key kG;
   e) compute a value e derived from said message m by application of a cryptographic function;
   f) compute a second signature component s utilizing, said plurality of updated private key parts, said ephemeral private key k, said first signature component r, and said value e.

8. The device of claim 7, wherein the processor is further operative to use a modified generator $G' = \beta G$, for a random masking value $\beta$, in place of said generator G in said cryptographic operation, wherein said masking value $\beta$ is presented as a plurality of masking value parts, and said computation of said second signature component s uses said plurality of masking value parts.

9. The device claim 8, wherein said plurality of private key parts comprises a pair of values $d_1, d_2$ with $d = d_1 + d_2$.

10. The device of claim 9, wherein said plurality of masking value parts comprises a pair of values $\beta_1, \beta_2$ with $\beta = \beta_1 + \beta_2$.

11. The device of claim 10, wherein said second signature component is computed as $s = (k\beta_1 + k\beta_2)^{-1}(e + d_1 r + d_2 r) \bmod n$, where n is an order of said cryptographic group.

12. The device of claim 10, wherein the processor is further operative to generate a random value w, and to utilize said random value w to compute said second signature component s.

13. The device of claim 11, wherein said second signature component s is computed as $s = w(kw\beta_1 + kw\beta_2)^{-1}(e + d_1 r + d_2 r) \bmod n$, where n is an order of said cryptographic group.

14. A computing device operative to execute a method of computing a public key corresponding to a private key k in a cryptosystem, wherein the cryptosystem uses a generator G, the device comprising:
   a memory; and,
   a processor operative to:
   a) represent a masking value $\beta$ as a plurality of values which may be combined to obtain said masking value, each of said plurality of values updated by a random value $\pi$ for each computation of said public key;
   b) combine each of said plurality of updated values with said private key k to obtain a plurality of private key components;
   c) combine each of said plurality of private key components with said generator G to obtain a plurality of public key components; and,
   d) combine said public key components to obtain said public key.

15. The device of claim 14, wherein said plurality of public key components are combined by addition.

16. The device of claim 14, wherein said plurality of values are combined with said private key by multiplication.

17. The device of claim 14, wherein said plurality of private key components are combined with said generator G by exponentiation.

18. The device of claim 14, wherein said public key is computed as $(k\beta_1)G + (k\beta_2)G$.

19. A computing device operative to execute a method for masking a secret value k used in a cryptographic operation, said device comprising:
- a memory;
- a processor operative to:
- generate a masking value $\beta$;
- split said masking value $\beta$ into a plurality of components;
- apply each of said plurality of components to said secret value k in performing said cryptographic operation to generate a signature component; and
- update said plurality of components by applying a random value $\pi$ to each said plurality of components such that said plurality of components, when combined, equal said masking value $\beta$.

20. The device of claim 19 wherein said signature component is for an ECDSA signature.

* * * * *